United States Patent
Lynn

(10) Patent No.: US 7,381,393 B2
(45) Date of Patent: Jun. 3, 2008

(54) PROCESS FOR SULFUR REMOVAL SUITABLE FOR TREATING HIGH-PRESSURE GAS STREAMS

(75) Inventor: Scott Lynn, Pleasant Hill, CA (US)

(73) Assignee: The Regents of the University of California, Oakland, CA (US)

( * ) Notice: Subject to any disclaimer, the term of this patent is extended or adjusted under 35 U.S.C. 154(b) by 153 days.

(21) Appl. No.: 10/961,354

(22) Filed: Oct. 7, 2004

(65) Prior Publication Data

US 2006/0078491 A1 Apr. 13, 2006

(51) Int. Cl.
*C01B 17/04* (2006.01)
*C01B 17/05* (2006.01)

(52) U.S. Cl. .................... 423/574.1; 423/575

(58) Field of Classification Search ............ 423/574.1, 423/575

See application file for complete search history.

(56) References Cited

U.S. PATENT DOCUMENTS 3,170,766 A * 2/1965 Townsend ............... 422/189
3,441,379 A * 4/1969 Renault ................... 423/575
3,781,413 A * 12/1973 Opferkuch, Jr. et al. . 423/574.1
4,053,575 A * 10/1977 Haas et al. ............... 423/575
4,919,912 A * 4/1990 Taggart et al. ........... 423/574.1
5,928,620 A * 7/1999 Lynn ....................... 423/574.1
6,416,729 B1 * 7/2002 DeBerry et al. .......... 423/573.1
6,495,117 B1 * 12/2002 Lynn ....................... 423/573.1

* cited by examiner

*Primary Examiner*—Timothy C Vanoy
(74) *Attorney, Agent, or Firm*—Townsend and Townsend and Crew LLP

(57) ABSTRACT

$H_2S$-containing gases, particularly such gases at elevated pressure, are treated to remove $H_2S$ by reaction in a liquid medium with $SO_2$, the $SO_2$ being present in stoichiometric excess with respect to the $H_2S$. The $SO_2$ is produced by combustion of sulfur, preferably sulfur produced in the reaction between $H_2S$ and $SO_2$, preferably with oxygen. The process produces a treated gas that is substantially free of both $H_2S$ and $SO_2$. An acid-gas absorber/stripper system or other system typically found in such processes to raise or concentrate the $H_2S$ level in the gas to be treated, is not needed in operations according to the invention.

29 Claims, 4 Drawing Sheets

PROCESS FOR SULFUR REMOVAL SUITABLE FOR TREATING HIGH-PRESSURE GAS STREAMS

BACKGROUND OF THE INVENTION

The present invention relates to a process of removing hydrogen sulfide from natural gas or an industrial gas, in an integrated system wherein sulfur is produced. More preferably, the present invention relates to such processes wherein the gas being treated is under a relatively high pressure.

One of the most common systems for processing natural gas containing hydrogen sulfide and producing sulfur involves the use of well-known absorber-stripper steps to separate $H_2S$ and the well-known Claus process to produce sulfur. In such system, in simplified form, the basic steps are usually:

(a) $H_2S$ removal from sour gas, using an $H_2S$ absorbent, to obtain sweetened product natural gas;
(b) stripping $H_2S$ out of the $H_2S$-rich absorbent to obtain $H_2S$;
(c) $H_2S$ combustion to obtain a mixture of $SO_2$ and $H_2S$;
(d) solid-catalyzed $H_2S$ reaction with $SO_2$ at high temperature to form and recover S and to make an off-gas containing reduced amounts of $H_2S$ and $SO_2$; and
(e) treating the off-gas from step (d) to recover as S a major fraction of the remaining amounts of $H_2S$ and $SO_2$ and to form a stack gas that is released to the atmosphere;

Steps (c) and (d) in combination are often regarded as the Claus process.

My U.S. Pat. No. 6,495,117, which is hereby incorporated herein by reference, describes a process in which gaseous hydrogen sulfide ($H_2S$) reacts with gaseous sulfur dioxide ($SO_2$) in the presence of an organic liquid or solvent, preferably above the melting point of sulfur, wherein the following reaction occurs:

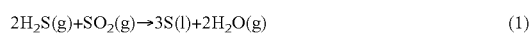

$$2H_2S(g)+SO_2(g) \rightarrow 3S(l)+2H_2O(g) \quad (1)$$

In that reaction, $H_2S$ is present in excess, so that an $H_2S$-containing off-gas is produced. The reacting gases may flow co-currently or counter-currently to a stream of the organic liquid. A preferred example of such a reactor is a tray-type column in which the reacting gases flow counter-currently to a stream of the organic liquid. The sulfur produced by Reaction (1) in either type of reactor forms a separate liquid phase that flows co-currently with the organic liquid.

The gaseous sulfur dioxide is produced by combustion of hydrogen sulfide contained in the reactor off-gas. Preferably this combustion is conducted fuel-rich to avoid the risk of forming $SO_3$ and $NO_x$, both of which are undesirable.

My U.S. Pat. No. 6,645,459 discloses a generally similar process in which $SO_2$ gas, en route from the combustion furnace to the reactor, is cooled using a direct or indirect quench to produce an aqueous stream that is introduced into the reactor at one or more points to provide cooling.

In other known processes, $H_2S$ and $SO_2$ are present in the reactor in stoichiometric or near-stoichiometric quantities. For example, a process piloted by the Jefferson Lake Sulfur Company but never put into commercial operation [*Oil and Gas Journal*, 50(4), pg. 59, 1951] burns sulfur to obtain $SO_2$ that is then mixed with an $H_2S$-containing gas. The $H_2S$ and $SO_2$ are in stoichiometric ratio. The mixture is heated and passed over a series of catalytic beds similar to those used in the conventional Claus process.

A process described in U.S. Pat. No. 3,170,766, (Townsend) generates $SO_2$ by burning sulfur with air and absorbing the $SO_2$ in di- or triethylene glycol and contacting an $H_2S$-containing gas with the solution at near-ambient temperature to generate a slurry of solid sulfur in the glycol. The slurry is then heated above the melting point of sulfur, settled, and the two liquid phases are separated by decanting. Water and unreacted $SO_2$ are separated from the glycol phase by distillation. A major disadvantage of this process is the need to cool the sulfur-saturated, regenerated glycol below the sulfur-precipitation temperature. Solid sulfur will coat cooling surfaces under these conditions if a heat exchanger is employed.

In a process described in U.S. Pat. No. 3,441,379 (Renault, assigned to the Institut Francais du Petrole and commercialized as the "IFP process") $H_2S$ and $SO_2$ react in a column in the presence of a solvent consisting of ethylene glycol, water and a catalyst at a temperature above the melting point of sulfur. The IFP process is employed to treat the tail gas of a Claus plant and hence the $H_2S$ and $SO_2$ are present, to the extent possible, in exact stoichiometric ratio—neither is in excess and hence neither can be substantially reacted away. As a result the gaseous effluent from the IFP reactor contains objectionable amounts of both $H_2S$ and $SO_2$. The process still requires incineration of the tail gas to eliminate $H_2S$, and the $SO_2$ content of the stack gas cannot meet today's strict environmental standards.

Another process, the CrystaSulf™ process, is described in U.S. Pat. Nos. 5,733,516 and 5,738,834 (DeBerry) In it, $H_2S$ reacts in a column at high pressure in the presence of a non-aqueous, water-immiscible organic solvent consisting of one or more tertiary amines to provide basicity and one or more aromatic solvents to render the solvent immiscible in water. The reaction is carried out at a temperature high enough, typically 50° to 70° C., to keep the sulfur formed in solution. The sulfur-rich solvent is then cooled to cause a part of the sulfur to precipitate by crystallization. The oxidizing power of the solvent is restored, either with air or with $SO_2$, before the solvent is recycled to the $H_2S$-absorption step. Because of the basicity of the CrystaSulf solvent, 10% or more of the $H_2S$ absorbed is converted to sulfate or thiosulfate, which must be removed continuously from the solvent with a caustic wash step. Costs are incurred for the caustic and for disposal of the salts formed. Because the solvent is water-immiscible, the sulfur product must be washed with methanol or other volatile solvent to clean the sulfur and to recover Crystasulf solvent. Both of the latter must then be treated further to reclaim the volatile solvent mixed with them. Still another complication of the CrystaSulf process is the need to cool the sulfur-saturated solvent in a heat exchanger to cause sulfur to precipitate. Solid sulfur coats the cooling surfaces and must be removed on a regular basis.

Another process is disclosed in U.S. Pat. No. 4,124,685 (Tarhan). Here again, an excess of $H_2S$ with respect to $SO_2$ is used in the reactor, to ensure that the reactor off-gases do not contain $SO_2$. However, the $H_2S$ in the reactor off-gas is recycled rather than combusted. $SO_2$ for the reaction is produced by combustion of sulfur, particularly some of the sulfur produced in the reactor.

Current processes for treating gases having low concentrations of $H_2S$ tend to involve sequestering the $H_2S$ in a chemical that is discarded, creating waste problems, or using an aqueous redox process to form a colloidal slurry of sulfur, that includes a complex regeneration system, or require an amine absorber/stripper system to concentrate the $H_2S$ before it is fed to the reactor.

Improvements to and variations in the Claus process are still being made. There is, however, still a need for a process for sulfur removal from gases, especially industrially generated gas streams, that meets high standards for emissions controls, is suitable for use with gas streams containing relatively small amounts of $H_2S$, recovers sulfur values, is economic, and is versatile. In addition, there is a need for a process having the capability of treating gases at higher pressures, where reaction rates are increased, and where solvent flows can be reduced. This invention provides such a process.

BRIEF SUMMARY OF THE INVENTION

The invention herein comprises a process for removing $H_2S$ from a gas containing it. The process is particularly suitable for removing $H_2S$ from a high-pressure gas stream, and/or from a stream containing relatively small amounts of $H_2S$, but amounts that nonetheless must be removed. The process enables operation without the use of an expensive amine scrubbing step, allowing feed of the $H_2S$-containing gas stream directly to a Claus reactor, and produces a product gas that is substantially free of both $H_2S$ and $SO_2$, as needed, for example for environmental considerations or for downstream processing. The process also provides for treating relatively hot feed streams—with temperatures as much as 140-150° C.—without prior cooling. In addition, the process provides for removal of other materials that may be contained in the gas stream, such as ammonia, HCl, and heavy metal contaminants. The process may be used for treating a wide range of such gaseous streams,) including natural gas streams, gas streams obtained by gasification of coal or heavy petroleum fractions, and waste stream gases obtained from various chemical process units.

In general, the invention herein comprises a process for removing $H_2S$ from a gas containing it comprising:

(a) reacting an $H_2S$-containing gas stream with a stoichiometric excess of $SO_2$ in a reactor to produce an $SO_2$-containing gas and liquid sulfur, the reaction being conducted in an organic liquid solvent containing a homogeneous catalyst that promotes the reaction $$2H_2S+SO_2 \Rightarrow 3S+2H_2O$$

at a temperature in the reactor that is above the melting point of sulfur;

(b) withdrawing liquid sulfur from the reactor;

(c) withdrawing the $SO_2$-containing gas of step (a) from the reactor;

(d) removing $SO_2$ from the gas of step (c) to produce a substantially $H_2S$- and $SO_2$-free gas, and (e) recycling the $SO_2$ removed in step (d) to step (a).

In a preferred embodiment, the gas being treated for $H_2S$ removal and the $SO_2$-containing gases recovered from the reactor are under pressure, most preferably under a pressure of at least about 5 bar absolute, preferably 10 bar absolute or above, and the reaction is also conducted under pressure. In another preferred embodiment the sulfur dioxide employed in the process is obtained by combusting sulfur. Most preferably at least some of the sulfur that is combusted is sulfur product recovered from the reactor in step (b).

In another aspect, the invention relates to the conduct of reaction (1) in the reactor with a stoichiometric excess of $SO_2$, and comprises:

in a process in which hydrogen sulfide in a hydrogen sulfide-containing gas is removed from said gas by reaction with sulfur dioxide to produce elemental sulfur in a liquid medium, the invention comprising conducting said reaction using a stoichiometric excess of sulfur dioxide.

Other preferred embodiments will be apparent from the description that follows.

DETAILED DESCRIPTION OF THE INVENTION

Figure 1:
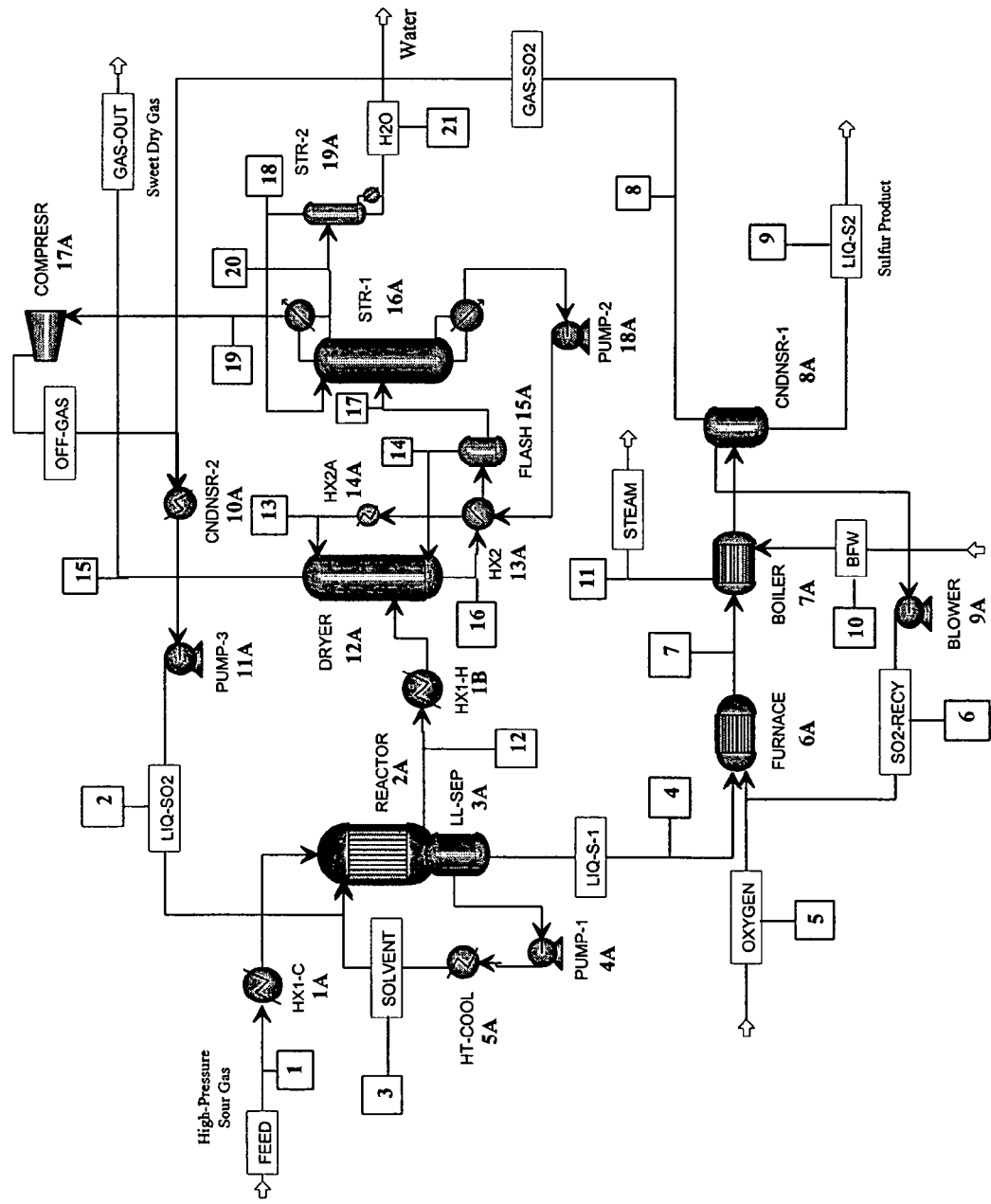
FIG. 1 is a flow sheet that depicts one embodiment of a process according to the invention, for treating a sour natural gas pipeline stream.

As stated above, in one aspect, the invention herein comprises a process for removing $H_2S$ from a gas containing it, comprising:

(a) reacting an $H_2S$-containing gas stream with a stoichiometric excess of $SO_2$ in a reactor to produce an $SO_2$-containing gas and liquid sulfur, the reaction being conducted in an organic liquid solvent containing a homogeneous catalyst that promotes the reaction $$2H_2S+SO_2 \Rightarrow 3S+2H_2O$$

at a temperature in the reactor that is above the melting point of sulfur;

(b) withdrawing liquid sulfur from the reactor;

(c) withdrawing the $SO_2$-containing gas of step (a) from the reactor;

(d) removing $SO_2$ from the gas of step (c) to produce a substantially $H_2S$- and $SO_2$-free gas, and (e) recycling the $SO_2$ removed in step (d) to step (a).

In the first step of the process, an $H_2S$-containing gas stream is reacted with a stoichiometric excess of $SO_2$ in a reactor to produce elemental sulfur and a gas that contains $SO_2$, together with water, and that contains substantially no $H_2S$. As stated above, this reaction step in and of itself constitutes an aspect of the invention, namely, in a process in which hydrogen sulfide in a hydrogen sulfide-containing gas is removed from said gas by reaction with sulfur dioxide to produce elemental sulfur in a liquid medium, the invention comprising conducting said reaction using a stoichiometric excess of sulfur dioxide.

The types of sour gases, i.e. gases containing $H_2S$, to which the processes of the invention may be applied include, but are not limited to, sulfur-containing natural gas, recycle gas from enhanced oil-recovery operations using $CO_2$ flooding, methane recovered from biological treatment of garbage and other wastes, synthesis gas, other $H_2S$-containing gases from industrial sources such as waste-gas streams and the like, and gasified coal or heavy petroleum products. The processes of this invention find particular use for treating a feed gas that contains components of value such that one wishes to remove only $H_2S$ and other sulfur compounds, and sometimes water, to the extent possible while recovering the valuable components as a treated gas.

The gas being treated may contain any reasonable amount of $H_2S$, with no real minimum content required. For example, the concentration of $H_2S$ may be as low as 100 ppm, or may be lower. Concentrations of 1-2 vol % $H_2S$ will be typical, while concentrations of 10 vol % $H_2S$ or higher can also be treated satisfactorily. The treated gas will be substantially free of both $H_2S$ and $SO_2$, i.e. the content of these in the treated gas will be at most what is acceptable under environmental regulations, downstream process constraints, and similar factors, for such gases. The $H_2S$ content of the treated gas is reduced below 4 ppmv, preferably below 1 ppmv, and may be reduced below 0.01 ppmv when the specifications for the treated gas require it. The amount of $SO_2$ added is stoichiometrically in excess relative to the $H_2S$, so that when the latter has reacted completely the treated gas leaving the reactor column generally will have a concentration of 0.01 to 1 vol % $SO_2$, preferably a concentration of 0.1 to 0.2 vol % $SO_2$ or 5% of the inlet $H_2S$ content, whichever is the higher.

Depending on the source, the sour gas may be available at pressures as low as ambient or as high as about 100 bar, or even higher. The sweetened gas produced by the process of this invention may be delivered at a pressure only slightly below the inlet pressure. The temperature of the gas may be as high as 140-150° C., particularly if the gas contains relatively small amounts of $H_2S$, so that the process is suitable for treating gases that are at such a relatively high temperature. If the gas is at a high temperature but has a relatively high concentration of $H_2S$, control of the reactor temperature is needed to offset the heat of reaction; this is typically done by conventional means such as injecting water into the reactor or providing it with a cooling jacket.

In many prior art processes in which such an $H_2S$-containing stream is reacted with $SO_2$ in a reactor, the sour gas stream is first passed through a system designed to concentrate or raise the amount of $H_2S$ in the gas stream. Quite typically, such a system will comprise an absorber-stripper system in which the gas stream is absorbed in an absorbent such as propylene carbonate or monoethanolamine, after which the absorbed $H_2S$ is stripped out of the absorbent liquid to produce an $H_2S$-rich gas to be fed to the reactor. However, in the present process, an absorber/stripper system or other system for raising the $H_2S$ content of the gas stream or for $H_2S$ removal from the gas stream, is not needed because the $H_2S$ is reacted away in situ. In addition, if the gas to be treated has a relatively low concentration of $H_2S$, it will be advantageous if the stream is at a relatively high temperature, for example about 120° C., as the gas may be introduced into the reactor without a need for preheating, and the heat of reaction will not be so great as to require injection of cooling water into the reactor for temperature control.

In the present process, the $H_2S$-containing gas is heated if necessary to bring it to an elevated temperature, and is reacted with $SO_2$ in a solvent to produce sulfur, preferably in the presence of a catalyst for reaction (1). Preferably the $SO_2$ is introduced into the reactor in liquid form under pressure, from a source as described below, but some or all of the $SO_2$ may be introduced into the reactor as a gas (e.g., an $SO_2$-rich gas) as convenient. The $H_2S$-containing gas fed to the reactor may contain as little as 0.01 mol % $H_2S$, but preferably contains 0.1 mol % or higher $H_2S$. If an $SO_2$-rich gas is used, it may contain as little as 20 mol % $SO_2$ (dry basis) but preferably contains 90 mol % or higher $SO_2$.

In previous processes, the $SO_2$ is typically provided by combustion of $H_2S$ in a furnace. For example, in such processes $H_2S$ recovered from the overhead of the reactor, perhaps together with $H_2S$ from other process sources, is combusted to produce the $SO_2$ for use in reaction (1). In some other processes, $SO_2$ is produced by combustion of a part of the elemental sulfur produced in the reactor, or obtained from an external source. In the present process the $SO_2$ introduced into the reactor is obtained from sources other than combustion of the $H_2S$, for example by purchase or by production in another process or installation at the same or another manufacturing site. For example, the source of the $SO_2$ for the reactor of this process may be a tank of the anhydrous liquid compound, purchased from a commercial source. Preferably the $SO_2$ is obtained by the combustion of sulfur. Some or all of the sulfur that is combusted may be sulfur from an external source, or some or all of it may be sulfur obtained from reaction (1). The former could be the case, for instance, if an inexpensive source of sulfur were available for combustion and/or if the quality of sulfur recovered from the process would suggest its sale or use elsewhere than for combustion. Most preferably, however, in the process of this invention the sulfur dioxide is produced by combusting a portion, especially one-third, of the sulfur obtained from reaction (1).

The reactor used in the process of the present invention preferably is a reactor column. The term "column" is used to denote that the reactor vessel is a column substantially similar to the type used in fractional distillation or gas absorption. This type of column is well known: an elongated vessel with trays or packing or even "bales" of material. The trays can be weep-hole trays or bubble-cap trays. In the reactor column of the present invention, liquid solvent flows downward. Liquid $SO_2$ is miscible with the solvent. However, when the $SO_2$ is introduced in liquid form it mixes with the solvent and the solution rapidly equilibrates with the gas phase flowing past it. The gases containing $H_2S$ and $SO_2$ either flow downward (co-currently with the liquid) or flow upward (counter-currently to the liquid). In a column employing co-current flow, only packing will be used, whereas in a column employing counter-current flow either packing or trays may be used.

The choice of co-current or counter-current flow configuration will depend on the scale of the operation, the kinetics of the reaction in the solvent chosen, the specifications for the sulfur product and other factors that are familiar to those skilled in the art. However, the principles of the invention are the same in both flow configurations as will be clear from the description that follows.

The reactor is operated at a temperature above the melting point of sulfur. The sulfur produced by Reaction (1) forms a separate liquid phase that flows co-currently with the organic liquid. Preferred operating temperatures for the reactor in the process of the present invention are 119° to 155° C., the temperature range within which elemental sulfur forms a clear, mobile liquid that is immiscible with the solvent, more preferably 125° to 145° C., and still more preferably 125° to 140° C. Reaction (1) occurs only in the liquid phase, and at temperatures up to 150° C. there is no equilibrium limitation.

The walls of the reactor and of the piping through which liquid flows are preferably heated to maintain a temperature in the desired range, to maintain sulfur formed in the reaction substantially in the liquid (molten) form and substantially to prevent deposit of solid sulfur. The temperature inside the reactor preferably is also maintained in that range. The inside temperature of the reactor is preferably maintained by: a) feeding a sufficiently large flow of cooled inlet solvent, b) adding water to the inlet solvent that vaporizes as the wet solvent flows through the reactor, c) injecting water at various points in the reactor, or by two or all three of the foregoing. The evaporation of water from the solvent may absorb most of the heat of the reaction; the energy released by Reaction (1) is about 3.4 times the molar heat of vaporization of $H_2O$.

Preferably, a heat exchanger is used in the solvent pump-around line to remove part of the heat of reaction during operation, as well as to heat the system prior to startup. The reactor preferably operates at a pressure of the order of from about 5 to about 100 bar absolute, most preferably from about 10 to about 80 bar absolute. The higher the pressure, the more rapid will be the reaction.

The organic liquid or solvent used in the reaction, which is also of the type described in WO 99/12849, which patent application is incorporated herein by reference, is preferably miscible with water, has a low volatility, is a relatively good solvent for both reactants, catalyzes Reaction (1), and is one in which liquid sulfur has a limited but low solubility.

Preferred solvents for use in the reactor include polyglycol ethers, such as the methyl ether of triethylene glycol, the dimethyl ether of triethylene glycol, and the dimethyl ether of polyethylene glycol. The methyl ether of diethyleneglycol is particularly preferred for use in the process of the present invention. The solvent used in the reactor may also be a catalyst for the reaction of $H_2S$ with $SO_2$ to form sulfur. However, according to a preferred embodiment of the present invention, a catalyst is added to the solvent to catalyze or enhance catalysis of the reaction of $H_2S$ with $SO_2$ to form sulfur. Preferred catalysts are those described in U.S. Pat. Nos. 5,928,620 and 6,645,459, and include tertiary amines (including mixtures of tertiary amines), including those in which alkyl and/or aryl groups are substituted on the nitrogen atom and those in which the nitrogen atom is contained within an aromatic-type ring. Examples of suitable tertiary amine catalysts in which the nitrogen atom is not included within a ring are trialkylamines such as triethylamine, tri-n-butylamine and mixed trialkylamines, and mixed alkyl/aryl tertiary amines such as N,N-dimethylaniline.

Although dissolved water is known to catalyze the reaction, the most preferred catalysts for this reaction are aromatic amines that contain an aromatic ring nitrogen atom that is not sterically hindered by substitutions at carbon atoms adjacent the ring nitrogen, i.e. N-substituted aromatic-ring compounds in which there is no moiety attached to a carbon adjacent to a ring nitrogen. Such catalysts include substituted and unsubstituted pyridines, quinolines, and iso-quinolines, such as pyridine, isoquinoline or 3-methyl pyridine, optionally substituted at one or more sites not adjacent the ring nitrogen atom. More preferably the catalyst is selected from pyridines, quinolines and isoquinolines, optionally substituted at one or more sites other than adjacent to a ring nitrogen atom with a polar group selected from the group consisting of hydroxyl, hydroxyalkyl, acetamido, acetyl, acetylalkyl, acetyloxy, acetyloxyalkyl, alkoxy, alkoxyalkyl, amino, alkylamino and aminoalkyl. The compound 3-hydroxymethyl pyridine(3-pyridyl carbinol) is a particularly preferred catalyst for use in the reactor column in the present invention.

As portions of the $H_2S$ and $SO_2$ dissolve in the organic solvent they react to form sulfur. The $SO_2$ is present in a stoichiometric excess relative to $H_2S$ fed to the reactor that is sufficiently high that the $H_2S$ has reacted substantially to extinction before the gas stream is withdrawn from the reactor. In general, that stoichiometric excess is at least 5%, preferably 10%, and is more preferably 20% or higher. Alternatively, when the inlet $H_2S$ content is 1 mole % or below, it is preferable to have an $SO_2$ content in the outlet gas of 0.1 to 0.2 mole %.

The sulfur formed by the reaction forms a separate liquid phase and separates by settling from the solvent stream at the bottom of the reactor.

The solvent stream leaving the bottom of the reactor is pumped through a heat exchanger where it is either heated or cooled, depending on process requirements, before being returned to the top of the column. The stream of liquid sulfur leaving the reactor preferably flows directly to the furnace where one-third of it is burned with an oxygen-containing gas such as air or preferably substantially pure oxygen to form the $SO_2$ required for the process. Alternatively, commercially supplied $SO_2$ could be employed or elemental sulfur from another source could be combusted to produce the $SO_2$, as mentioned above. The high temperature and oxidizing atmosphere in the combustion zone eliminate the small amounts of dissolved solvent and other organic components in sulfur obtained from the reactor. The oxygen-containing gas used in the process may be in the form of molecular oxygen, a commercial mixture of molecular oxygen with an inert gas such as nitrogen, air, or oxygen-enriched air, but is preferably substantially pure oxygen or a commercial mixture that contains predominantly oxygen. In most cases involving the treatment of gases at high pressure in the reactor, it will be advantageous to use oxygen for the combustion, at a pressure of about 10 bar absolute, so that the $SO_2$ formed may readily be condensed and pumped as a liquid to reactor pressure. It will then also be advantageous to recycle gaseous $SO_2$ to the furnace to prevent having an excessive combustion temperature. The product sulfur collected in this process will contain a small amount of dissolved $SO_2$ but will otherwise be free of contaminants.

The gas stream leaving the reactor is cooled to near-ambient temperature. Some water of reaction may form during cooling, depending on the humidity of the original sour gas. Such water might contain some solvent vapor and would be sent to the top of the regenerator column. The cooled gas enters the conventional dryer column where both water and unreacted $SO_2$ are absorbed. The drying medium may be either di- or triethylene glycol (DEG or TEG). Diethylene glycol methyl ether (DGM), which is a preferred solvent for use in the reactor, or other glycol ethers may also be employed in the dryer column. The product gas leaving the dryer column will be substantially free of $SO_2$ and dried to meet process specifications. The wet, rich solvent from the dryer column then flows to the regenerator column, where it is stripped of both $H_2O$ and $SO_2$ at near-ambient pressure. Water is condensed from the $SO_2$ gas, stripped of dissolved $SO_2$, and collected as a product of the process. The gaseous $SO_2$, together with methane or other hydrocarbon absorbed in the dryer column, is compressed and recycled to the reactor.

The processes of this invention are described in more details in the Figures and in the following description of them.

FIG. 1 is a Process Flow Diagram (PFD) depicting a process for treating a natural gas stream that contains $H_2S$.

In FIG. 1 the feed, stream 1, is sour natural gas at pipeline pressure, about 69 bar absolute (1000 psia). It is heated as necessary by passing it through one or more heat exchangers 1A to bring the temperature to about 125° C. (It is to be understood that the heat exchangers shown in this and the other figures may consist of two or more actual heat exchangers as required, as will be apparent to those skilled in the art.) A part of the heating may be provided by cooling the hot gas stream 12 leaving the reactor column in heat exchangers 1B. A part of heat exchangers 1A and 1B may be the cold and hot sides of the same heat exchanger.

Reactor. The feed gas in line 1, a stream of a solvent that catalyses the reaction between $H_2S$ and $SO_2$ (line 3), and a stream of liquid $SO_2$ (line 2), all enter the top of the reactor 2A. In this example the reactor is a packed column employing co-current flow of the gas and liquid phases. The use of a column employing counter-current flow of the gas and liquid phases is also within the scope of this invention, in which case stream 1 would enter the bottom of reactor 2A. The reactor contains a solvent and catalyst, as described above, and is operated at conditions, including temperature and pressure, as described above. The solvent and the $SO_2$ may be mixed before they enter the reactor (not shown). The $SO_2$ is in sufficient stoichiometric excess relative to the $H_2S$ in the feed gas that the $H_2S$ will have reacted essentially to extinction, 1 ppmv or lower, when gas stream 12 leaves the reactor. The $SO_2$ content of the exiting gas stream 12 is maintained between 0.1 and 0.2 vol %. The sulfur formed by the reaction forms a separate liquid phase and separates by settling from the solvent stream at the bottom of the column in the liquid/liquid separation section, 3A. The solvent stream 3 leaving the bottom of reactor 2A is pumped by pump 4A through a heat exchanger 5A where it is either heated or cooled, depending on process requirements, before flowing back into the top of the reactor column.

b) $SO_2$ Generation. The stream of liquid sulfur 4 leaving liquid/liquid separation section 3A flows directly to the combustion furnace 6A, where (when time-averaged) exactly one-third of it is burned with a stream of oxygen 5 to form the $SO_2$ required for the process. In accordance with a preferred embodiment of the invention, the high pressure in reactor column 2A makes it advantageous to use oxygen for the combustion, at a pressure of about 10 bar absolute, so that the $SO_2$ formed, stream 8, may readily be condensed and pumped as a liquid to reactor pressure. The use of air or oxygen-enriched air instead of oxygen is an alternative, but would require either that the accompanying nitrogen be acceptable when mixed with the feed gas in the reactor or that the $SO_2$ and $N_2$ be separated in an absorber/stripper operation before the $SO_2$ is compressed to the pressure of the reactor column. However, these alternatives would still fall within the scope of the present invention.

A part of the $SO_2$ produced in furnace 6A and cooled in boiler 7A is preferably recycled in line 6 to reduce the high temperatures caused by the high heat release of $S/O_2$ combustion, and thereby to reduce associated material problems. The high temperature and oxidizing atmosphere in the combustion zone preclude formation of $H_2$, CO, COS and soot while eliminating the small amounts of dissolved solvent and other organic components that may be present in sulfur stream 4. At the same time, the presence of $S_2$ vapor in the combustion zone precludes the formation of $SO_3$ or $NO_x$ (when nitrogen compounds are present). The combustion gas-leaving furnace 6A in line 7 enters boiler 7A, which may be integral with furnace 6A. Stream 7 is cooled in boiler 10A and then flows to condenser 8A where the uncombusted sulfur vapor condenses as a liquid, stream 9, and is removed as product. Boiler feed water 10 is preheated in condenser 8A (flow not shown) and then absorbs the heat released in boiler 7A to produce high-pressure steam, line 11. The product sulfur collected in this process, stream 9, will contain a small amount of dissolved $SO_2$, less than 1 wt. %, but will otherwise generally be free of contaminants.

c) $SO_2$ and $H_2O$ Removal. The gas stream leaving reactor column 2A, stream 12, is preferably cooled to near-ambient temperature in heat exchanger(s) 1B. Some water may condense during cooling, depending on the water content of the original sour gas and the amount of $H_2S$ that reacts. While not shown in this figure, such water might contain some solvent vapor, and, if so, would be sent to the top of the stripper column 16A. The cooled gas stream 12 enters a conventional natural-gas dryer column, 12A, where it is contacted by the recycled solvent in stream 13, which has been cooled to near-ambient temperature (or below) in heat exchangers 13A and 14A. The drying medium is a polar organic solvent such as di- or triethylene glycol or diethylene glycol methyl ether (DGM). DGM is a preferred solvent for use in the reactor column; other glycol ethers may also be employed in the dryer column. Solvents of this type are quite effective for absorbing water vapor and the unreacted $SO_2$. The product gas stream 15 leaving dryer column 12A will be substantially free of $SO_2$ (1 ppmv or below), and will be dried to a dew point of 0° C. or to meet process specifications.

The wet rich solvent, stream 16, from dryer column 12A is then heated in heat exchanger 13A and enters flash drum 15A. Dissolved light hydrocarbons absorbed from the natural gas, such as methane and ethane, are preferably flashed and returned to the bottom tray of column 12A via stream 14. Since stream 12 has entered column 12A a few trays higher, this flashing operation serves to free the solvent in stream 17 of most of the dissolved light hydrocarbons.

d) Dryer Solvent Regeneration. Solvent stream 17 flows to stripper column 16A, where it is stripped of both $H_2O$ and $SO_2$ at near-ambient pressure. The regenerated solvent from the bottom of column 16A, stream 13, is substantially free of $SO_2$ and preferably has a water content, about 1 wt. %, sufficiently low to allow drying the product gas, stream 15, to meet humidity specifications. Stream 13 is pumped by pump 18A through heat exchangers 13A and 14A to the top of column 12A. In the condenser of column 16A, water is condensed from the $SO_2$ gas and sent to stripper 19A via stream 20. Some of the condensate is preferably returned to column 16A as reflux to prevent loss of solvent vapor. The off-gas $SO_2$, stream 19, is saturated with water vapor at the temperature and pressure of the condenser and may still contain methane or other hydrocarbon absorbed in the dryer column 12A. Stream 19 is pressurized in compressor 17A to about 10 bar, combined with the $SO_2$ in stream 8, and sent to condenser 10A. Liquid $SO_2$, stream 2, is pumped to reactor column 2A by pump 11A. The condensate, stream 20 from column 16A, is sent to column 19A, where it is stripped of dissolved $SO_2$ and collected as a product of the process, stream 21. The overhead vapor from column 19A, stream 18, is preferably returned to column 16A to be condensed.

Figure 2:
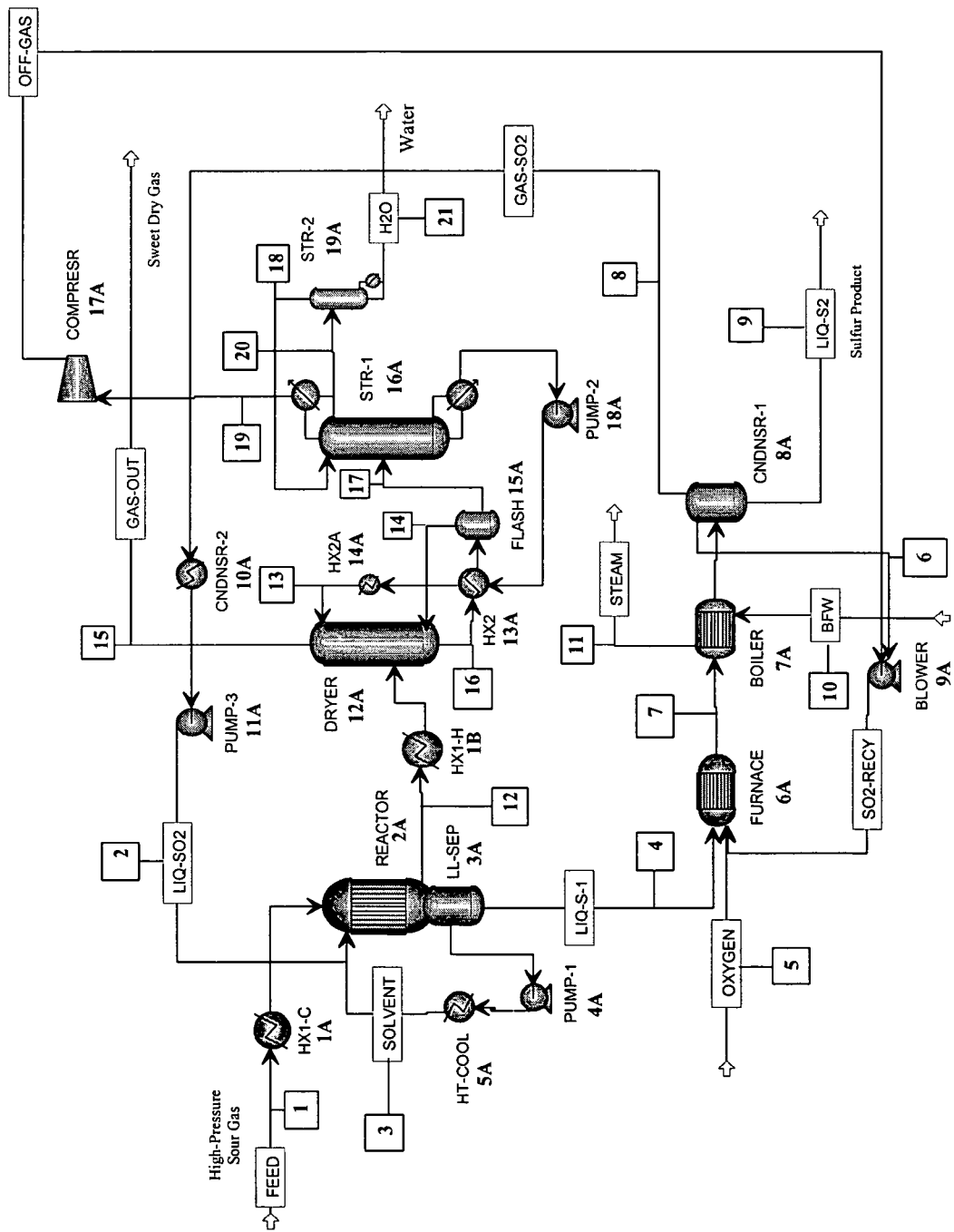
FIG. 2 is a flow sheet that depicts a second embodiment of a process according to the invention that may be used for treating a gas containing mercaptans and other sulfur-containing contaminants.

FIG. 2 is a PFD depicting a variation of the process in FIG. 1 that may be used for treating a natural gas containing a small amount, typically 0.1 vol % or less, of methyl mercaptan or other sulfur-containing contaminants. Such components or contaminants are unreactive in the reactor column but will be absorbed along with water and $SO_2$ in the dryer column. It would then be undesirable to recycle the regenerator off-gas directly to the reactor since these contaminants would not have been removed from the system and would eventually leave in the treated gas. All numerical designations of flow lines and equipment are the same as in FIG. 1 except that the off-gas, stream 19, from stripper 16A, after being pressurized in compressor 17A, is preferably mixed with $SO_2$ recycle stream 6 as it enters blower 9A and is sent as a combined stream to furnace 6A. Alternatively, stream 19 could be fed directly to furnace 6A, where mercaptans and other organic compounds will be converted to $SO_2$, $CO_2$ and $H_2O$. The product gas, stream 15, leaving dryer column 12A will be substantially free of $SO_2$ (1 ppmv or below) and mercaptan (0.01 ppmv or below), and will be dried to a dew point of 0° C., or as appropriate to meet process specifications.

Figure 3:
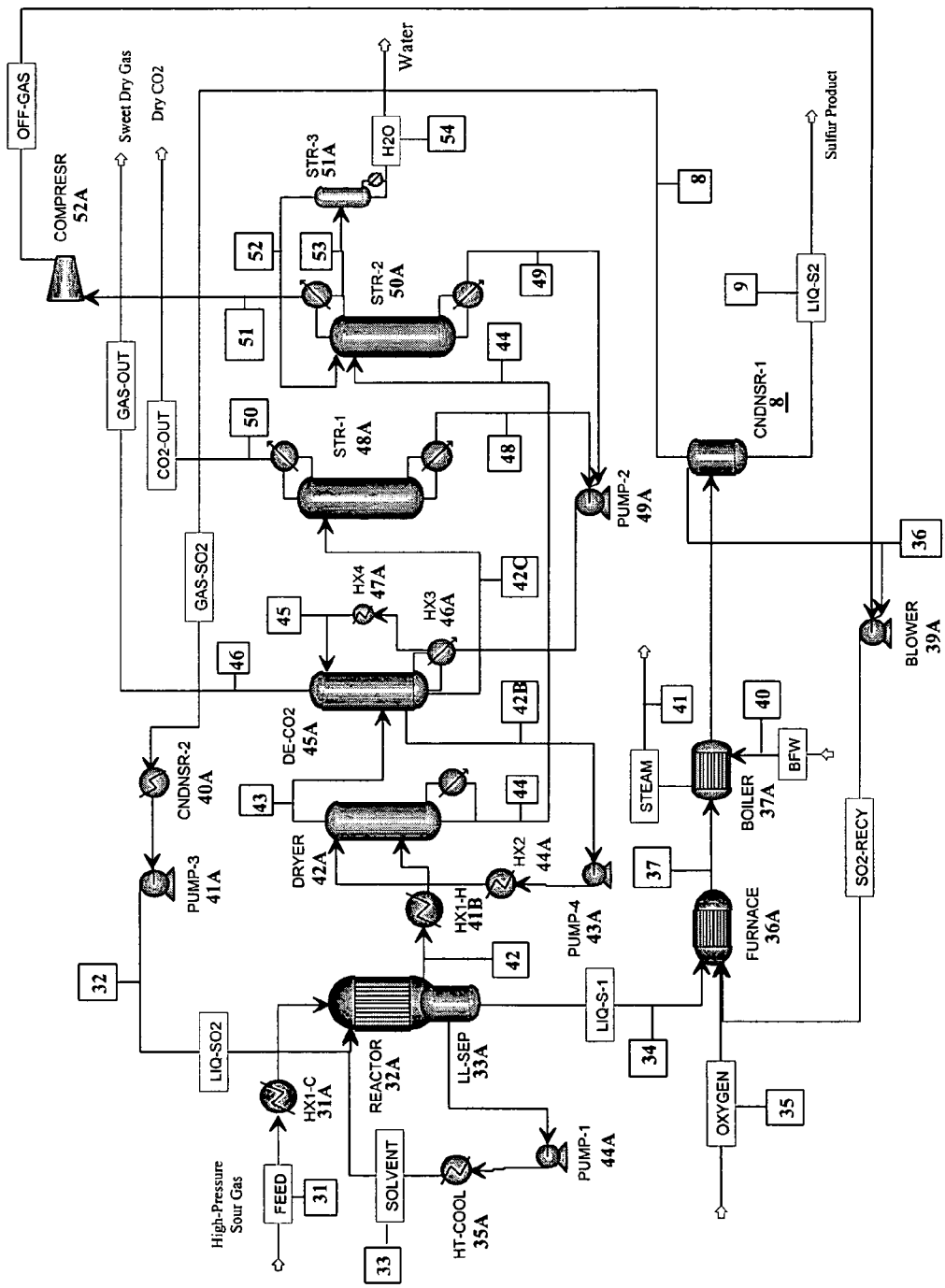
FIG. 3 is a flow sheet that depicts a third embodiment of a process according to the invention, for treating a gas that also contains a high concentration of carbon dioxide.

FIG. 3 is a PFD depicting a process according to the invention for treating a sour natural gas that contains a concentration of carbon dioxide that exceeds pipeline specifications. In such a case, it is necessary to remove both $H_2S$ and $CO_2$. This is done conventionally by an alkanol-amine absorber/stripper operation. When the $CO_2/H_2S$ ratio is 1/1 or less the off-gas from the amine stripper can be treated directly by conventional technology. However, when that ratio exceeds 2/1, it may be necessary to carry out an expensive separation of the $CO_2$ from the $H_2S$ before the latter can be converted to sulfur. FIG. 3 shows a preferred version of the present invention for accomplishing this purpose. The process as shown in FIG. 1 is combined with the absorption of $CO_2$ with a physical solvent to effect the removal of both $CO_2$ and $H_2S$ from a sour high-pressure gas that contains 10 vol % $CO_2$, 2 vol % $H_2S$ and 0.1 vol % $CH_3SH$. Provision for the removal of mercaptans is also included in this embodiment.

a) Reactor. The feed gas in line 31, a solvent stream that contains a catalyst for the reaction between $H_2S$ and $SO_2$, line 33, and a stream of liquid $SO_2$, line 32, all enter the top of the reactor 32A. As before, the reactor is a packed column employing co-current flow of the gas and liquid phases. The use of a column employing counter-current flow of the gas and liquid phases is also within the scope of this invention, in which case stream 31 would enter the bottom of reactor 32A. The reactor is operated at conditions, including temperature and pressure, as described above. The solvent and the $SO_2$ may be mixed before they enter the reactor (not shown). The $SO_2$ is in sufficient stoichiometric excess relative to the $H_2S$ in the feed gas that the $H_2S$ has reacted essentially to extinction, 1 ppmv or lower, when gas stream 32 leaves the reactor. The $SO_2$ content of the exiting gas stream 32 is maintained between 0.1 and 0.2 vol %. The sulfur formed by the reaction forms a separate liquid phase and separates by settling from the solvent stream at the bottom of the column in the liquid/liquid separation section, 33A. The solvent stream 33 leaving liquid/liquid separation section 33A is pumped by pump 34A through a heat exchanger 35A where it is either heated or cooled, depending on process requirements, before flowing back into the top of the reactor column.

b) $SO_2$ Generation. The stream of liquid sulfur 34 leaving section 33A flows directly to the combustion furnace 36A, where, when time-averaged, exactly one-third of it is burned with a stream of oxygen 35 to form the $SO_2$ required for the process. In accordance with a preferred embodiment of the invention, the high pressure in reactor 32A makes it advantageous to use oxygen for the combustion, at a pressure of about 10 bar absolute, so that the $SO_2$ formed, stream 38, may readily be condensed and pumped as a liquid to reactor pressure (via condenser 40B and pump 41A). The use of air or oxygen-enriched air instead of oxygen is an alternative, but would require either that the accompanying nitrogen be acceptable when mixed with the feed gas in the reactor or that the $SO_2$ and $N_2$ be separated in an absorber/stripper operation before the $SO_2$ is compressed to the pressure of the reactor column. However, these alternatives would still fall within the scope of the present invention.

A part of the $SO_2$ produced in furnace 36A is preferably recycled through line 36 to reduce the high temperatures caused by the high heat release of $S/O_2$ combustion, and thereby to reduce associated material problems. The high temperature and oxidizing atmosphere in the combustion zone preclude formation of $H_2$, CO, COS and soot while eliminating the small amounts of dissolved solvent and other organic components that may be present in sulfur stream 34. At the same time, the presence of $S_2$ vapor in the combustion zone precludes the formation of $SO_3$ or $NO_x$ (when nitrogen compounds are present). The combustion gas leaving furnace 36A in line 37 enters boiler 37A, which may be integral with furnace 36A. Stream 37 is cooled in boiler 37A and then flows to condenser 38A where the remaining sulfur vapor condenses as a liquid, stream 39, and is removed as product. Boiler feed water 40 can be preheated in condenser 38A (flow not shown) and then absorb the heat released in boiler 37A to produce high-pressure steam, line 41. The product sulfur collected in this process, stream 39, will contain a small amount of dissolved $SO_2$, less than 1 wt. %, but will otherwise generally be free of contaminants.

c) $SO_2$, $H_2O$ and $CO_2$ Removal. The gas stream leaving reactor 32A (stream 42) is cooled to near-ambient temperature in heat exchanger(s) 41B. Some water of reaction may form during cooling, depending on the humidity of the original sour gas. While not shown in this Figure, such water might contain some solvent vapor and would be sent to the top of the stripper column 50A.

Stream 42 enters dryer column 42A, where it is contacted with solvent stream 42B. The solvent absorbs mercaptans, $SO_2$ and $H_2O$, together with some $CO_2$ and methane. Solvent stream 42B leaves column 45A with a high concentration of dissolved $CO_2$, having essentially the same composition as stream 42C. Stream 42B has preferably been cooled to near-ambient temperature (or below) in heat exchanger(s) 44A. The dissolved $CO_2$ tends to desorb from the solvent as mercaptans, $SO_2$ and $H_2O$ are absorbed, which reduces the temperature rise that might otherwise occur. The reboiler 42D at the bottom of column 42A preferably heats the solvent sufficiently to strip out a large fraction of the $CO_2$, methane and ethane while retaining substantially all of the mercaptans, $SO_2$ and $H_2O$ in stream 44, which flows to stripper 50A.

The gas stream, 43, leaving column 42A, flows to column 45A and is contacted with freshly stripped solvent stream 45. Stream 45 has been cooled to near-ambient temperature (or below) in heat exchanger 47A and is sized to absorb a major fraction of the $CO_2$ in stream 43. The reboiler at the bottom of column 45A, heat exchanger 46A, cools solvent stream 45 (the combined streams 48 and 49 from pump 49A) while heating solvent stream 42C. This heating is sufficient to strip out a large fraction of the methane and ethane while retaining substantially all of the $CO_2$ in stream 42C, which flows to stripper 48A. The product gas, stream 46, leaving column 45A will have a $CO_2$ content of 1 vol % or less, will be substantially free of $SO_2$ (1 ppmv or below), mercaptan (0.01 ppmv or below), and will be dried to a dew point of 0° C. or to meet process specifications.

Stripper 48A operates near ambient pressure and removes most of the $CO_2$ from its feed, solvent stream 42C. Solvent stream 42C contains about 1 wt % water, so that most of the stripping vapor in the reboiler of stripper 48A is $H_2O$ and the temperature is low enough to prevent thermal degradation of the solvent. No water is removed from the system in stripper 48A; water vapor is condensed at the top of 48A and is returned as a reflux that prevents loss of solvent vapor. The solvent, stream 48, leaving stripper 48A, mixes with stream 49 from stripper 50A and enters pump 49A.

The feed to stripper 50A is stream 44 from column 42A. Stripper 50A also operates near ambient pressure and removes most of the $SO_2$, mercaptans and excess $H_2O$ from its feed. Solvent stream 49 preferably leaves the bottom of stripper 50A containing about 1 wt % water, so that most of the stripping vapor in the reboiler of stripper 50A is $H_2O$ and the temperature is low enough to prevent thermal degradation of the solvent. The vapor stream, 51, leaving the condenser of stripper 50A contains the $SO_2$, mercaptans and any residual hydrocarbons in stream 44. The condensate leaving stripper 50A, stream 53, enters stripper 51A, where dissolved $SO_2$ is stripped out. Gas stream 51 from stripper 50A is pressurized by compressor 52A and sent to blower 39A where it mixes with $SO_2$ recycle stream 36 and flows to furnace 36A. Vapor stream 52 is sent back to the top of stripper 50A to be condensed. The water leaving stripper 51A in stream 54 represents the excess water entering the system in feed stream 31 plus the water of reaction formed in reactor column 32A and furnace 36A.

Figure 4:
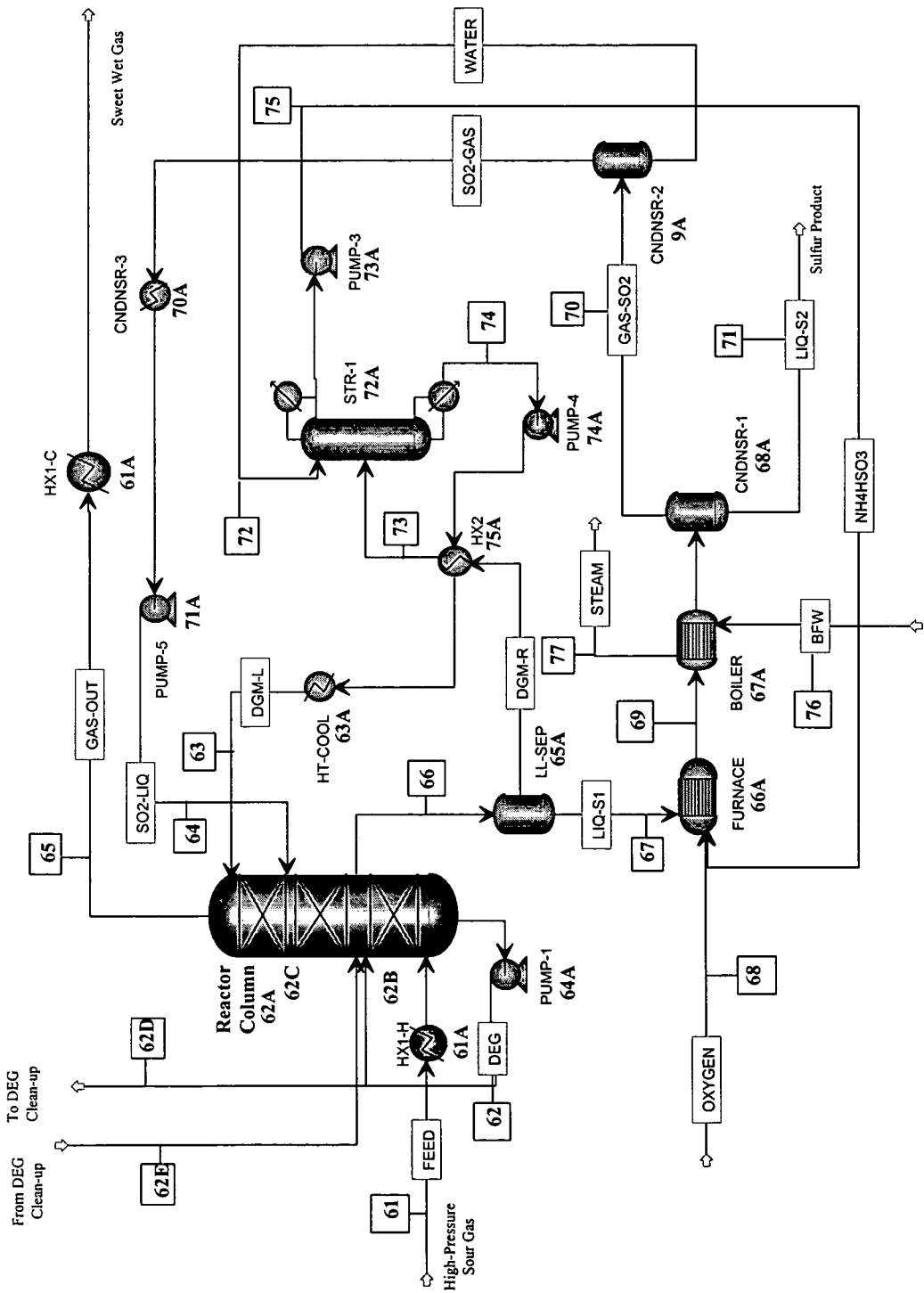
FIG. 4 is a flow sheet that depicts a fourth embodiment of a process according to the invention, for treating a sour synthesis gas obtained by gasifying coal or a heavy petroleum fraction.

FIG. 4 is a PFD depicting a process according to the invention for treating a sour synthesis gas obtained by gasifying coal or a heavy petroleum fraction.

In some cases, when coal is gasified the syngas produced contains not only $H_2S$ but also $NH_3$ and HCl and heavy metals such as As, Cd, Hg and Se. Before the syngas is used as fuel for a gas turbine all of the above should be reduced to very low values.

a) Reactor. Column 62A is divided into two sections: the scrub section, 62B, and the reactor section, 62C. Note that in this example the gas and liquid streams flow countercurrently through the column, but it is to be understood that co-current flow of the gas and liquid streams could also be employed. The sour gas feed (61) enters scrub section 62B where it is contacted with a stream (62) of diethylene glycol, DEG (or other glycol ether). At the pressure, temperature and water content of the syngas the DEG will have a steady-state water content of about 10 to 20 wt %. It will also have substantially smaller, but significant, steady-state contents of $NH_3$ and $H_2S$. As a result, the HCl content of the feed gas will be absorbed very effectively to form highly soluble $NH_4Cl$ and the heavy metals As, Cd and Hg will be absorbed very effectively to form their respective, very insoluble sulfides. Se will be present in the syngas as $H_2Se$ and will be absorbed to form highly soluble $(NH_4)_2Se$ under these conditions. At the bottom of 62B the DEG is withdrawn and circulated by pump 64A back to the top of 62B. A small slipstream of stream 62, stream 62D, may be withdrawn, perhaps intermittently, for filtration and other treatment to remove the accumulated impurities, and then returned as stream 62E. While DEG is the preferred solvent for use in 62, DGM and other glycol ethers, as well as other polar organic solvents, may also prove to be satisfactory. The gas stream leaving scrub section 62B passes into reactor section 62C through a chimney that effectively prevents entrainment of solvent from 62B with the gas flow into 62C as well as preventing solvent from section 62C from descending into section 62B.

In the operation of the reactor section 62C of column 62A a stream of glycol ether (preferably diethylene glycol methyl ether, DGM), stream 63, is circulated from the bottom of stripper 72A. The temperature of stream 63 may be increased or decreased by heat exchanger 63A, depending on the heat balance in section 62C. Stream 63 is lean solvent that is depleted of $SO_2$ and $NH_3$, so it effectively absorbs those components from the gas stream rising in section 62C. $NH_3$ passes through the reactor section, 62C, without reacting but is absorbed as an ammonium salt. However, stream 63 has a water content that is essentially in equilibrium with that gas. A stream of liquid $SO_2$ (64) is injected into section 62C at one or more points below the entry of stream 63, and is mixed with the solvent flow within the column. The quantity of $SO_2$ fed in stream 64 exceeds that required to react with the $H_2S$ in stream 61 by an amount between 0.5 and 1 mole per mole of $NH_3$ in stream 61. The water formed by the reaction between $H_2S$ and $SO_2$ remains in the vapor phase. The sulfur forms a second liquid phase. The two liquids flow from the bottom of section 62C as stream 66 to liquid/liquid separator 65A. The solvent stream (73) flows to stripper 72A by way of heat exchanger 75A. The liquid sulfur stream (67) flows to furnace 66A.

b) $NH_3$ and $SO_2$ Removal. The gas stream leaving section 62C of column 62A has passed through a section in which the gas has been contacted with solvent stream 63 that is depleted in $NH_3$ and $SO_2$ but has a water content that is in near equilibrium with the gas. Depending on the water content of the solvent, $NH_3$ and $SO_2$ will be absorbed as the separate compounds, as the ion pair or as ammonium sulfite and/or bisulfite. Gas stream 65, the treated gas leaving the process, has a temperature and contents of water and $CO_2$ that are little changed from those of feed stream 61 but is substantially free of $H_2S$, $NH_3$, HCl, $SO_2$ and heavy metals. Liquid stream 73 exits section 62C of column 62A and flows to stripper 72A, which operates at near-ambient pressure. Stream 73 exchanges heat with stream 74, the bottoms stream from stripper 72A, in heat exchanger(s) 75A. After passing through pump 74A, and heat exchanger(s) 63A, lean solvent stream 74 is renamed stream 63. The overhead vapor from stripper 72A is condensed to form a solution of ammonium sulfite and bisulfite, stream 75. Water stream 72 is provided to insure that no solid salt is formed.

Since stripper column 72A operates at near-ambient pressure, relatively little heat is exchanged in heat exchanger 75A and heater/cooler 63A. This is an example of pressure-swing absorption/desorption. As was noted above, the flow of $SO_2$ in stream 64 is regulated so that the molar ratio of $SO_2$ to $NH_3$ stripped out of fat solvent stream 73 in column 72A is between 0.5 and 1. Both can therefore be absorbed in water stream 72 (plus the water from the condensed overhead vapor) and pumped as stream 75 to furnace 66A to moderate the combustion temperature, destroy the $NH_3$ and recover the $SO_2$.

c) $SO_2$ Generation. The stream of liquid sulfur 67 leaving reactor column 62A flows directly to the furnace (66A) where, when time-averaged, exactly one-third of it is burned with a stream of oxygen, 68, to form the $SO_2$ required for the process. In accordance with a preferred embodiment of the invention, the high pressure in reactor column 62A makes it advantageous to use oxygen for the combustion, at a pressure of about 10 bar absolute, so that the $SO_2$ formed, stream 64, may readily be condensed and pumped as a liquid to reactor pressure. Stream 75 is used to moderate the temperature of combustion in furnace 66A. The high temperature that would result when one-third of the sulfur in stream 67 reacts with oxygen in stream 68 could damage the materials in furnace 66A if such moderation were not provided. The $NH_3$ content of stream 75 is converted to $N_2$ and $H_2O$ as it passes through furnace 66A. No $NO_3$ is formed however because of the presence of $S_2$ vapor. The combustion gas (69) raises steam in boiler 67A and then passes through condenser 68A, where liquid sulfur is collected. The wet $SO_2$ gas, stream 70, then flows to condenser 79A, where liquid water, saturated with dissolved $SO_2$, is condensed. While not shown in this PFD, boiler feed water stream 76 serves as the coolant in condensers 68A and 69A and is preheated thereby. The $SO_2$ stream (64) leaving condenser 69A is converted to liquid in condenser 70A, and then compressed to the pressure of column 62A by pump 71A. Pump 71A must also be able to handle the small amounts of $N_2$ and $CO_2$ that will be present. The water balance in the system is maintained by water stream 72, which returns the water condensed from $SO_2$ stream 70.

From the foregoing description, various modifications and changes in the compositions and methods of this invention will occur to those skilled in the art. All such modifications coming within the scope of the appended claims are intended to be included therein.

All publications, including but not limited to patents and patent applications, cited in this specification are herein incorporated by reference as if each individual publication were specifically and individually indicated to be incorporated by reference herein as though fully set forth.

What is claimed is:

1. In a process in which hydrogen sulfide in a hydrogen sulfide-containing gas is removed from said gas by reaction with sulfur dioxide to produce elemental sulfur in a liquid medium, the invention comprising conducting said reaction so as to react the hydrogen sulfide substantially to extinction using a stoichiometric excess of sulfur dioxide and producing a gas substantially free of hydrogen sulfide and containing from 0.01 to 1 vol. % sulfur dioxide.

2. A process according to claim 1 in which the $H_2S$-containing gas stream is at a pressure of at least about 5 bar absolute.

3. A process according to claim 1 in which the $H_2S$-containing gas stream is at a pressure of from about 10 to about 100 bar absolute.

4. A process according to claim 1 in which the reactor is operated at a pressure of from about 10 to about 100 bar absolute.

5. A process according to claim 1 in which the reactor is operated at a temperature of from about 119 to about 155° C.

6. A process according to claim 1 in which the reactor is operated at a temperature of from about 125 to about 145° C.

7. A process according to claim 1 in which the reactor is operated at a temperature of from about 125 to about 140° C.

8. A process according to claim 1 in which the $SO_2$ is introduced into the reaction in the form of a liquid.

9. A process according to claim 1 in which part or all the $SO_2$ is introduced into the reaction in the form of a gas.

10. A process according to claim 1 in which the reaction is conducted in the presence of a solvent selected from one or a mixture of polyglycol ethers.

11. A process according to claim 10 in which the one or more polyglycol ethers is selected from the methyl ether of triethylene glycol, the dimethyl ether of triethylene glycol, the dimethyl ether of polyethylene glycol, and the methyl ether of diethylene glycol.

12. A process according to claim 1 in which the reaction is conducted in the presence of a homogenous catalyst for the reaction.

13. A process according to claim 12 in which the catalyst is selected from aromatic amines that contain an aromatic ring nitrogen atom and in which there is no moiety attached to a carbon atom adjacent to a ring nitrogen atom.

14. A process according to claim 13 in which the catalyst is selected from pyridines, quinolines and isoquinolines, optionally substituted at one or more sites other than adjacent to a ring nitrogen atom with a polar group selected from the group consisting of hydroxyl, hydroxyalkyl, acetamido, acetyl, acetylalkyl, acetyloxy, acetyloxyalkyl, alkoxy, alkoxyalkyl, amino, alkylamino and aminoalkyl.

15. A process according to claim 13 in which the catalyst comprises 3-hydroxymethylpyridine.

16. A process for removing $H_2S$ from a gas containing it, comprising:
 (a) reacting an $H_2S$-containing gas stream with a stoichiometric excess of $SO_2$ in a reactor so as to react the hydrogen sulfide substantially to extinction and to produce an $SO_2$-containing gas substantially free of $H_2S$ and containing from 0.01 to 1 vol. % sulfur dioxide and liquid sulfur, the reaction being conducted in an organic liquid solvent containing a homogeneous catalyst that promotes the reaction

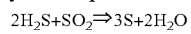

at a temperature in the reactor that is above the melting point of sulfur;
 (b) withdrawing liquid sulfur from the reactor;
 (c) withdrawing the $SO_2$-containing gas of step (a) from the reactor;
 (d) removing $SO_2$ from the gas of step (c) to produce a substantially $H_2S$- and $SO_2$-free gas, and
 (e) recycling the $SO_2$ removed in step (d) to step (a).

17. A process according to claim 16 in which the $H_2S$-containing gas stream is at a pressure of at least about 5 bar absolute.

18. A process according to claim 16 in which the $H_2S$-containing gas stream is at a pressure of from about 10 to about 100 bar absolute.

19. A process according to claim 16 in which the reactor is operated at a pressure of from about 10 to about 100 bar absolute.

20. A process according to claim 16 in which the $H_2S$-containing gas is introduced into the reactor without having previously been passed through a system for raising or concentrating the $H_2S$ content of the gas.

21. A process according to claim 16 in which the $H_2S$-containing gas is synthesis gas containing one or more of $H_2$, CO, $H_2O$, COS and $CO_2$.

22. A process according to claim 21 in which the $H_2S$-containing gas is synthesis gas produced by gasifying coal or a heavy petroleum fraction.

23. A process according to claim 16 in which the $H_2S$-containing gas comprises natural gas or an $H_2S$-containing refinery gas.

24. A process according to claim 16 in which the $H_2S$-containing gas additionally contains one or more substances selected from HCl, $NH_3$, and heavy metals, and said one or more substances are substantially removed from the $H_2S$-containing gas.

25. A process according to claim 24 in which said one or more substances are removed from the $H_2S$-containing gas by contacting said gas with a glycol ether containing about 10-20% water.

26. A process according to claim 16 further comprising water removal from the product gas in step (d).

27. A process according to claim 16 further comprising removing sulfur-containing compounds other than $SO_2$ from the $SO_2$-containing gas of step (c), compressing the so treated gas and introducing it into a combustion step to produce $SO_2$ from said sulfur-containing compounds.

28. A process according to claim 16 in which $SO_2$ produced in step (c) is compressed and condensed to obtain liquid $SO_2$, and the liquid $SO_2$ is introduced into step (a) under elevated pressure.

29. A process for removing $H_2S$ from a gas containing it, comprising:
(a) reacting an $H_2S$-containing gas stream with a stoichiometric excess of $SO_2$ in a reactor so as to react the hydrogen sulfide substantially to extinction and to produce an $SO_2$-containing gas substantially free of $H_2S$ and liquid sulfur and containing from 0.01 to 1 vol. % sulfur dioxide, the $H_2S$-containing gas being at a pressure of at least 5 bar absolute, the reaction being conducted in an organic liquid solvent containing a homogeneous catalyst that promotes the reaction $$2H_2S + SO_2 \Rightarrow 3S + 2H_2O$$

at a temperature in the reactor that is above the melting point of sulfur;
(b) withdrawing liquid sulfur from the reactor;
(c) combusting the sulfur from step (b) to produce $SO_2$ used in step (a);
(d) withdrawing the $SO_2$-containing gas of step (a) from the reactor;
(e) removing $SO_2$ from the gas of step (d) to produce a substantially $H_2S$- and $SO_2$-free gas, and
(f) recycling the $SO_2$ removed in step (e) to step (a).

* * * * *